US011853062B2

(12) United States Patent
Healey et al.

(10) Patent No.: US 11,853,062 B2
(45) Date of Patent: Dec. 26, 2023

(54) AUTONOMOUS MOBILE GOODS TRANSFER

(71) Applicant: Intel Corporation, Santa Clara, CA (US)

(72) Inventors: Jennifer Anne Healey, San Jose, CA (US); Omar Ulises Florez Choque, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 17/498,535

(22) Filed: Oct. 11, 2021

(65) Prior Publication Data

US 2022/0027852 A1    Jan. 27, 2022

Related U.S. Application Data

(63) Continuation of application No. 16/377,459, filed on Apr. 8, 2019, now Pat. No. 11,163,305, which is a
(Continued)

(51) Int. Cl.
| | |
|---|---|
| *G05D 1/00* | (2006.01) |
| *B25J 9/16* | (2006.01) |
| *G06Q 30/0241* | (2023.01) |
| *G05D 1/02* | (2020.01) |
| *G01C 21/34* | (2006.01) |

(Continued)

(52) U.S. Cl.
CPC ......... *G05D 1/0088* (2013.01); *B25J 9/1697* (2013.01); *G01C 21/3438* (2013.01); *G05D 1/0234* (2013.01); *G05D 1/0293* (2013.01); *G06Q 10/08* (2013.01); *G06Q 10/083* (2013.01); *G06Q 30/0241* (2013.01); *G06Q 30/0265* (2013.01); *G06Q 30/06* (2013.01); *G06Q 50/28* (2013.01); *G05D 2201/0213* (2013.01); *G06N 3/08* (2013.01)

(58) Field of Classification Search
None
See application file for complete search history.

(56) References Cited

U.S. PATENT DOCUMENTS 10,245,993 B1 * 4/2019 Brady ................. B60P 7/13
10,252,659 B2    4/2019 Healey et al.
(Continued)

OTHER PUBLICATIONS

"U.S. Appl. No. 15/475,512, Non Final Office Action dated Jun. 14, 2018", 19 pgs.
(Continued)

*Primary Examiner* — Tamara L Weber
(74) *Attorney, Agent, or Firm* — Schwegman Lundberg & Woessner, P.A.

(57) ABSTRACT

Disclosed in some examples, are devices, methods, systems, and machine readable mediums that provide for automated goods exchange between autonomous vehicles while the autonomous vehicles are still in motion. This may be used to efficiently ship packages long distances as well as to transfer goods to consumers. This allows shippers to transfer goods from one truck to another without having to stop and unload the truck, decreasing costs by limiting human involvement and improving efficiency. Likewise, mobile merchants, such as food trucks, may sell to consumers in cars without having to stop to perform the exchange, increasing the convenience to consumers.

20 Claims, 13 Drawing Sheets

Related U.S. Application Data continuation of application No. 15/475,512, filed on Mar. 31, 2017, now Pat. No. 10,252,659.

(51) Int. Cl.

| | |
|---|---|
| *G06Q 10/08* | (2023.01) |
| *G06Q 50/28* | (2012.01) |
| *G06Q 30/0251* | (2023.01) |
| *G06Q 10/083* | (2023.01) |
| *G06Q 30/06* | (2023.01) |
| *G06N 3/08* | (2023.01) |

(56) References Cited

U.S. PATENT DOCUMENTS

| | | | |
|---|---|---|---|
| 2002/0049535 | A1 | 4/2002 | Rigo et al. |
| 2009/0182436 | A1 | 7/2009 | Ferrara |
| 2015/0362922 | A1 | 12/2015 | Dollinger et al. |
| 2016/0375814 | A1 | 12/2016 | Jochim et al. |
| 2017/0120902 | A1 | 5/2017 | Kentley et al. |
| 2017/0192419 | A1 | 7/2017 | Ray et al. |
| 2018/0022405 | A1 | 1/2018 | Gecchelin et al. |
| 2018/0039274 | A1 | 2/2018 | Saibel |
| 2018/0120843 | A1 | 5/2018 | Berntorp et al. |
| 2018/0164818 | A1 | 6/2018 | Wilkinson et al. |
| 2018/0260778 | A1* | 9/2018 | Mazetti ............... G01C 21/206 |
| 2018/0281657 | A1 | 10/2018 | Healey et al. |
| 2020/0004248 | A1 | 1/2020 | Healey et al. |

OTHER PUBLICATIONS

"U.S. Appl. No. 15/475,512, Notice of Allowance dated Nov. 21, 2018", 10 pgs.

"U.S. Appl. No. 15/475,512, Response Filed Sep. 13, 2018 to Non Final Office Action dated Jun. 14, 2018", 12 pgs.

"U.S. Appl. No. 16/377,459, Examiner Interview Summary dated Apr. 28, 2021", 2 pgs.

"U.S. Appl. No. 16/377,459, Final Office Action dated Feb. 23, 2021", 23 pgs.

"U.S. Appl. No. 16/377,459, Non Final Office Action dated Aug. 19, 2020", 21 pgs.

"U.S. Appl. No. 16/377,459, Notice of Allowance dated Jul. 1, 2021", 5 pgs.

"U.S. Appl. No. 16/377,459, Preliminary Amendment filed Nov. 5, 2019", 7 pgs.

"U.S. Appl. No. 16/377,459, Response filed May 24, 2021 to Final Office Action dated Feb. 23, 2021", 14 pgs.

"U.S. Appl. No. 16/377,459, Response filed Nov. 19, 2020 to Non Final Office Action dated Aug. 19, 2020", 11 pgs.

"Google's AI Wins Fifth and Final Game Against Go Genius Lee Sedol", Wired, [Online]. [Accessed Aug. 24, 2017]. Retrieved from the Internet: <URL: https://www.wired.com/2016/03/googles-ai-wins-fifth-final-game-go-genius-lee-sedol/>, (Mar. 15, 2016), 16 pgs.

Lee, Chang-Shing, et al., "Human vs. Computer Go: Review and Prospect", IEEE Computational Intelligence Magazine, (Aug. 2016), 6 pgs.

Lipson H, et al., "Driverless: Intelligent Cars and the Road Ahead", MIT Press,, (2016), 7-8;155; and 158-164.

Mnih, Volodymyr, et al., "Playing Atari with Deep Reinforcement Learning", DeepMind Technologies, (Dec. 19, 2013), 9 pgs.

Oshana, et al., "Software Engineering for Embedded Systems: Methods, Practical Techniques, and Applications", (2013), 15 pgs.

\* cited by examiner

AUTONOMOUS MOBILE GOODS TRANSFER

PRIORITY

This application is a continuation of U.S. application Ser. No. 16/377,459, filed Apr. 8, 2019, which is a continuation of U.S. application Ser. No. 15/475,512, filed Mar. 31, 2017, now issued as U.S. Pat. No. 10,252,659, all of which are incorporated by reference herein in their entirety.

TECHNICAL FIELD

Embodiments pertain to autonomous or semi-autonomous vehicles. Some embodiments relate to transferring of goods between autonomous road vehicles.

BACKGROUND

Autonomous vehicles are vehicles that operate on a physical road without human intervention or with minimal human intervention using sensors and complex computer algorithms. Example autonomous vehicles include WAYMO® by GOOGLE®, TESLA® AUTOPILOT® and others. In some examples, the autonomous vehicles perform automatic steering, acceleration, braking, obstacle avoidance, and navigation.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
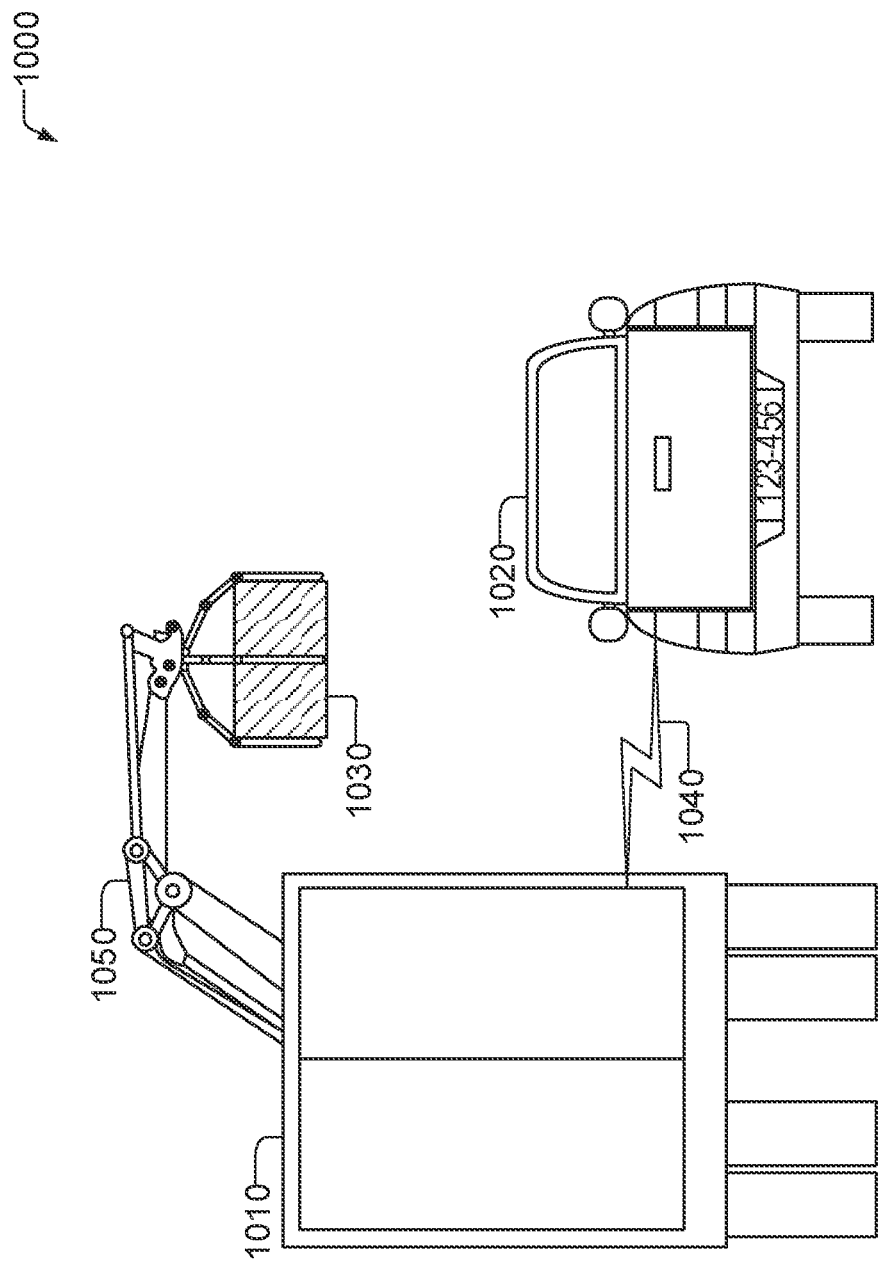
FIG. 1 is a diagram of a transfer of a package from a truck to a passenger vehicle according to some examples of the present disclosure.

Goods destined for stores and other marketplaces may take many different routes to the store, and finally to the user's home or other final location. For example, goods may be shipped from the country of manufacture, loaded from a container onto a truck, and then transferred between different trucks many times at various transfer points. Each time the goods are transferred, they are unloaded from a first truck and reloaded onto another truck. This is costly and time consuming requiring human labor to load and unload the truck. The goods may then be delivered to a store or a warehouse of an online retailer. Having goods available at static retailer locations is also inconvenient for the consumer. The consumer who wants to purchase the goods either needs to drive to a store and pick up the item or wait to have a delivery vehicle come to their home with the item.

Disclosed in some examples, are devices, methods, systems, and machine readable mediums that provide for automated goods exchange between autonomous vehicles while the autonomous vehicles are still in motion. This may be used to efficiently ship packages long distances as well as to transfer goods to consumers. This allows shippers to transfer goods from one truck to another without having to stop and unload the truck, decreasing costs by limiting human involvement and improving efficiency. Likewise, mobile merchants, such as food trucks, may sell to consumers in cars without having to stop to perform the exchange, increasing the convenience to consumers and revenue to the merchant.

In consumer purchasing examples, an autonomous or semi-autonomous vehicle may carry a certain quantity of one or more different products, for example pizzas, milk, fast food, and/or other goods. Vehicles distributing to end customers may be seen as an autonomous equivalent to "ice cream trucks" that drive around and attract customers with a song or bell. These trucks may execute a transfer of goods while both parties are in motion. In some examples a vending truck may approach a customer, collect an order via voice or other mechanisms and vend the product using a robotic arm to deliver the product to the customer in their vehicle. In other instances the product may be pre-ordered and a route may be planned to meet with the customer's vehicle. Consumer convenience would thereby be increased. Consumers may pick up dinner while driving home without having to stop off at the restaurant! In fact, the restaurant comes to the consumer!

Goods ordering may be conducted in a number of ways. For example, the consumer may pre-order goods online or over the phone in advance and the consumer's vehicle and the merchant's vehicle may coordinate the transfer phase. In other examples, the consumer may order spontaneously based upon detecting the merchant's vehicle. For example, the customer (or the customer's mobile device) may see (or sense) a vehicle on road and order spontaneously using a smartphone or in-vehicle infotainment system. In other examples, the vehicle may announce to customers that it is in the area and customers may then find a route to the vehicle, ordering en-route.

Use of in-motion transfer of goods to ship long distances from a first location to a second location may comprise performing multiple transfers between vehicles. Thus a particular item may be transferred from a first autonomous vehicle to a second autonomous vehicle that may transfer it to a third autonomous vehicle and so on until the item reaches its destination. The exact sequence of vehicles on which the package travels may be determined ad-hoc (each vehicle in the item's route may determine the next vehicle to transfer the item to itself), or the sequence may be determined based upon a network-accessible autonomous goods transfer service. Once the next autonomous vehicle is selected, the system determines a route to position the current vehicle and the next vehicle close to each other and then begins the process of maneuvering each vehicle in an optimal goods transfer position and to actually transfer the goods.

In some examples, cars or trucks receiving goods may have compartments specifically designed for the reception of vehicle-to-vehicle goods transfers. In some examples, trucks transferring goods to other trucks or consumers would have devices, such as a robotic arm to complete the transfer.

In some examples, the transfer phase may be accomplished through machine learning algorithms such as reinforcement learning. With these techniques, the inputs are sensed states (how close the vehicles are to each other, or how close a package is to a target) and the result is a series of actions that are actively optimized to accomplish a goal (the transfer of the package).

Turning now to FIG. 1, a diagram 1000 of a transfer of a package from a truck 1010 to a passenger vehicle 1020 is shown according to some examples of the present disclosure. Both truck 1010 and passenger vehicle 1020 are autonomous vehicles that are in motion. While a passenger vehicle 1020 is shown, other types of vehicles, such as a shipping truck may receive goods through the autonomous transfer process. Truck 1010 is transferring a package 1030 to passenger vehicle 1020—in this case to the bed of a pickup truck using a robotic arm 1050. Other possible locations include transferring the package inside the cabin of the passenger vehicle 1020 (e.g., through an open window), onto the roof rack, or into a special compartment.

Various algorithms (e.g., computer vision algorithms or other sensing system) may be utilized to ensure that the robotic arm properly places the package in the bed of the truck. The pickup bed of the passenger vehicle 1020 may also have one or more optical markers that assist the computer vision of the robotic arm 1050 of the truck 1010 in properly locating and placing the package in the truck bed. Truck 1010 and passenger vehicle 1020 may communicate 1040 to coordinate their movements either through a network or in a P2P fashion using short range wireless communications. Example short range wireless communications include RFID, Bluetooth, WLAN (e.g., WIFI), vehicle-to-vehicle and vehicle-to-infrastructure communication standards (e.g., 802.11p). Short range wireless communications are wireless communications of a typical expected range of 100 meters or less.

Figure 2:
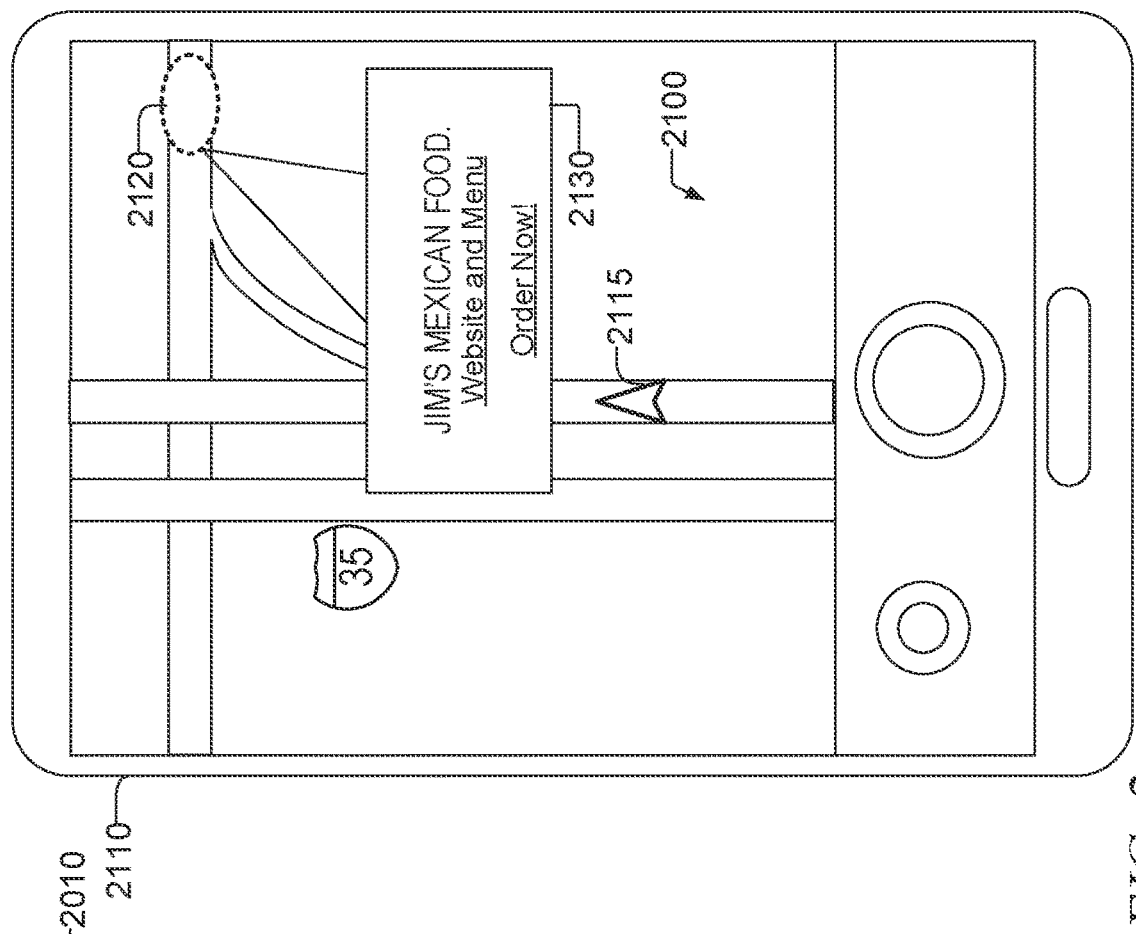
FIG. 2 shows example GUIs for finding and selecting products for autonomous vehicle transfer according to some examples of the present disclosure.
Figure 2:
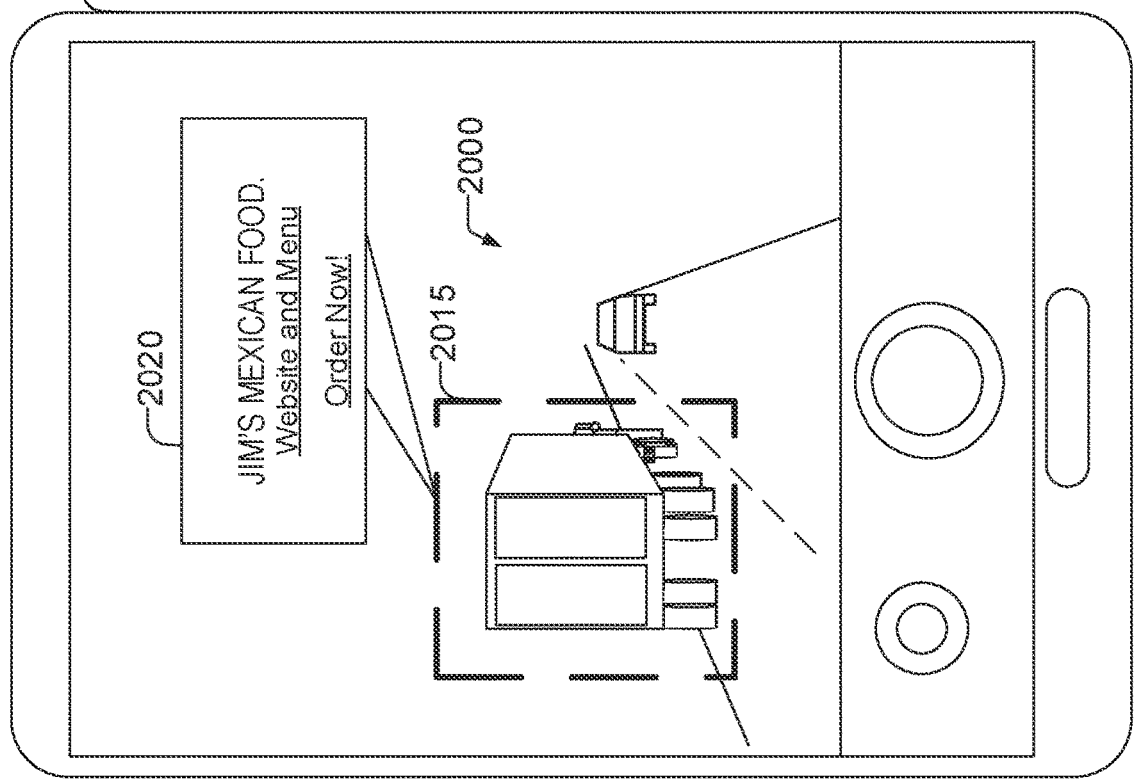

FIG. 2 shows example GUIs 2000 and 2100 for finding and selecting products for autonomous vehicle transfer. The GUIs 2000 and 2100 are shown displayed on a mobile computing device 2010 and 2110. Mobile computing devices 2010 and 2110 may be the same mobile computing device or different mobile computing devices. GUI 2000 may be a live view of a video camera showing a road in front of the user. Truck 2015, highlighted by a dotted box, may offer one or more transferrable physical items. In some examples, the mobile computing device 2010 may detect the truck 2015 and the availability of the truck to transfer goods or services based upon detecting a broadcast from the truck 2015 (e.g., through short range wireless technologies). The broadcast by truck 2015 may contain information about itself, including product information and ordering information. In other examples, rather than broadcast this information via short range wireless technologies, the mobile computing device 2010 may recognize a license plate, or other identifier and contact a network-accessible autonomous goods transfer service for information on the truck 2015. Truck 2015 may have registered the information with the network-accessible autonomous goods transfer service. In still other examples, the truck 2015 may send location information about itself to the network-accessible autonomous goods transfer service and the mobile computing device 2010 may receive information on nearby trucks that offer autonomous transfers of goods and services.

The information is displayed in a box 2020 which the user may utilize to get information on the truck 2015 and the goods and services that are offered. Upon selecting the order now button, the user may order the goods and the vehicle of the user and the truck may maneuver themselves to transfer the package. To order, in some examples, the user may navigate to a website that is provided by the merchant operating truck 2015. The website may relay the order to the truck 2015, providing it with identification of the car that the customer is ordering from. In other examples, the ordering may be peer-to-peer over short range wireless technologies. The order may contain information on the car of the customer to enable the merchant to find the car to transfer the goods to (e.g., description, license plate, GPS coordinates, and the like). In other examples, a token is sent to the customer, and the customer may broadcast the token over short range wireless technologies. The truck 2015 then determines the customer's vehicle by locating the token.

GUI 2100 shows a map view whereby the user's location is shown by triangle 2115 on a map. Nearby trucks 2120 may be shown on a map along with the information 2130. Information 2130 may be obtained using the same methods as described for GUI 2000.

Figure 3:
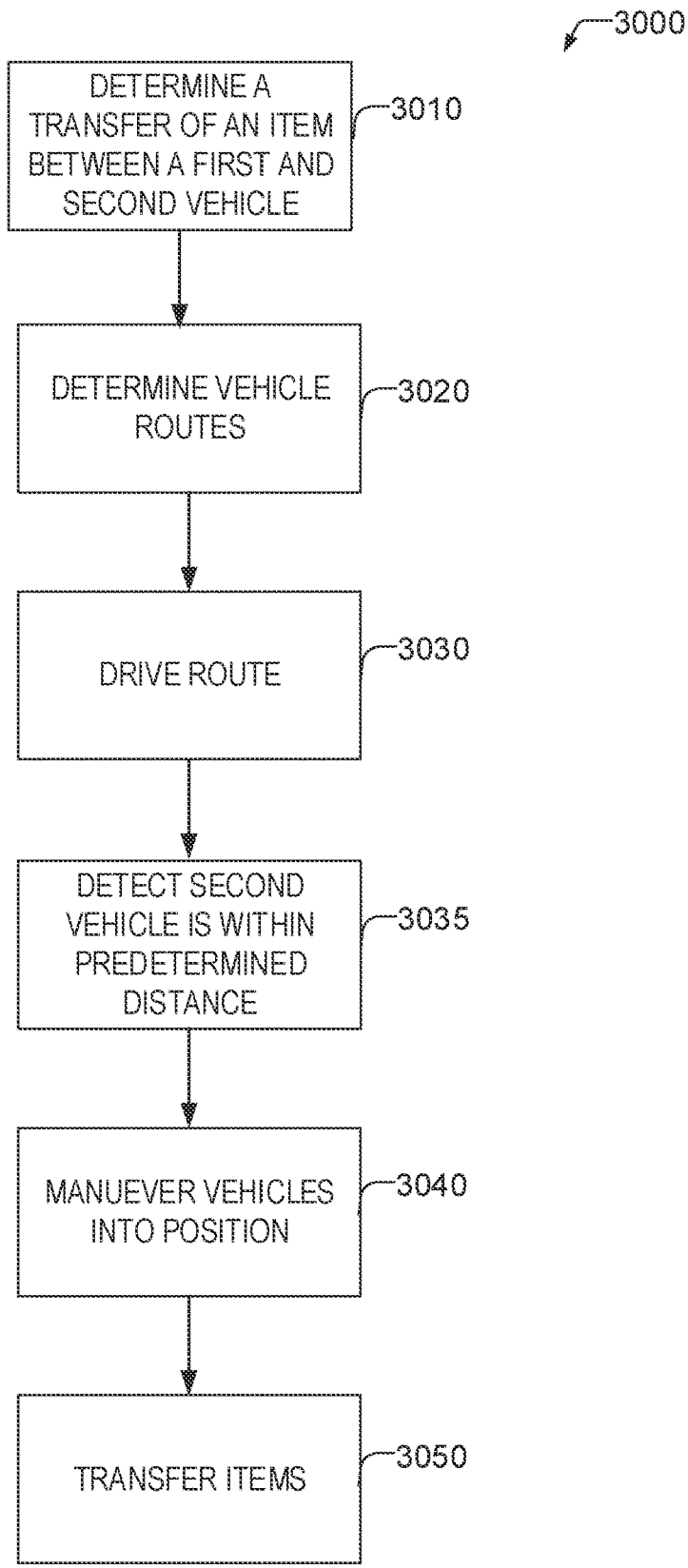
FIG. 3 is a flowchart of a method of a transfer of a physical item between autonomous vehicles according to some examples of the present disclosure.

Turning now to FIG. 3, a flowchart of a method 3000 of transferring a physical item between autonomous vehicles is shown according to some examples of the present disclosure. The method 3000 may be performed by either the receiver of the physical item or the transferor and may be performed for both the consumer-goods examples and examples in which a package is travelling long distances. At operation 3010 a determination that a transfer of a physical item between autonomous vehicles is to occur is made. This determination may be the result of a user ordering an item from an autonomous vehicle (e.g., like a moving vending machine). In some examples, this may be the result of a determination that either the first or second vehicles is to be a next "hop" in a route of a package from a source to a destination.

At operation 3020 the first autonomous vehicle (which may be an autonomous vehicle computing device or a mobile computing device of an occupant in communication with the autonomous vehicle) and the second autonomous vehicle may determine a route to get close to each other. This may be negotiated between the vehicles, or may be based upon a route specified by the network-accessible autonomous goods transfer service. At operation 3030 the autonomous vehicles drive the determined route. In some examples, the drivers may manually drive the route and then later hand over control to the autonomous vehicle for the item transfer. In other examples, the vehicles may drive the route autonomously. At operation 3035, the first autonomous vehicle may determine that the second autonomous vehicle is within a predetermined proximity of it. The predetermined proximity may be hard-coded as a distance at which the autonomous vehicles may reliably be expected to sense and/or communicate with each other using short range wireless technologies such that they may maneuver into position to transfer the item. In other examples, the predetermined proximity may be determined when the autonomous vehicles are within sensor and/or short range wireless communications.

Figure 6:
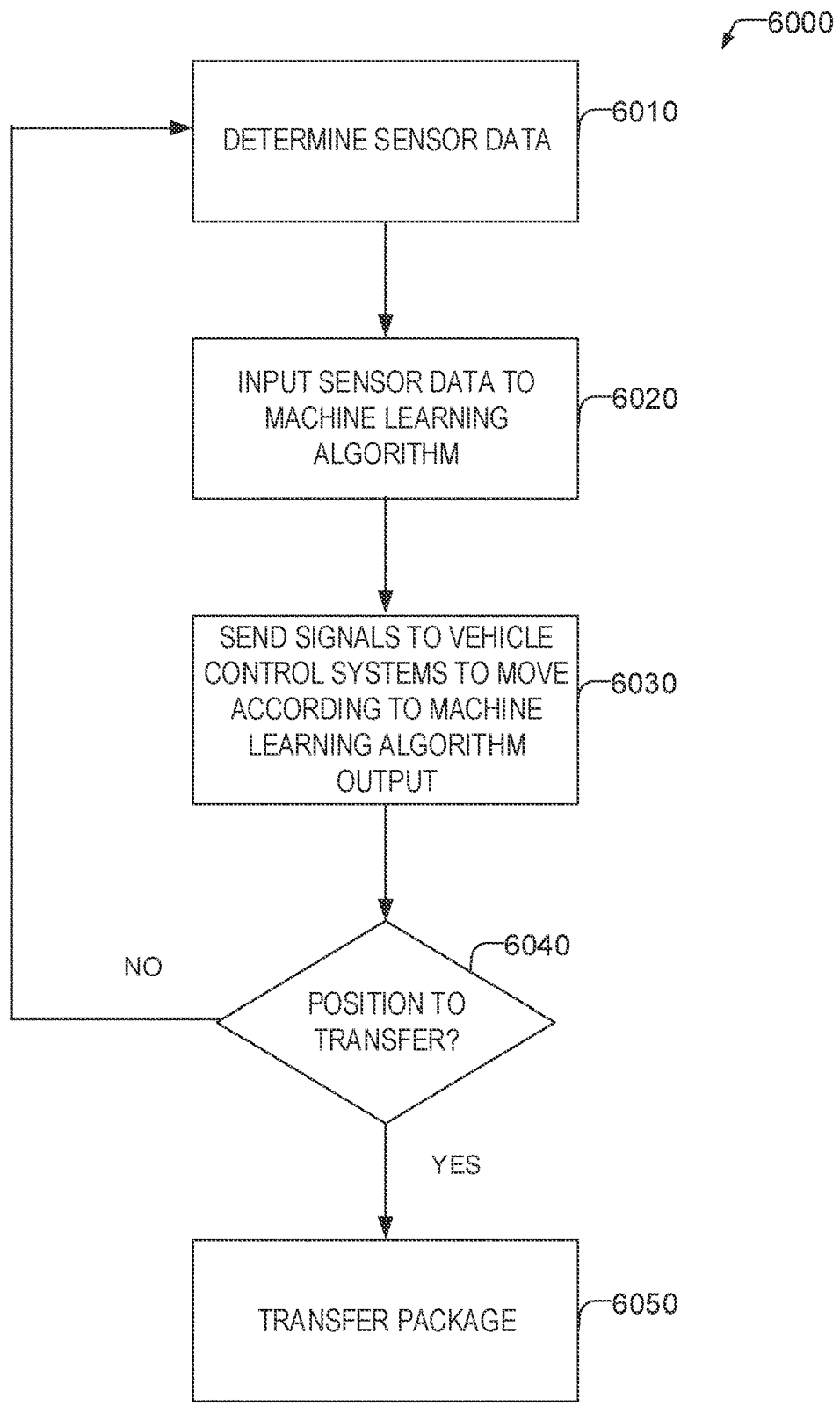
FIG. 6 shows a flowchart of a method of an item transfer according to some examples of the present disclosure.
Figure 7:
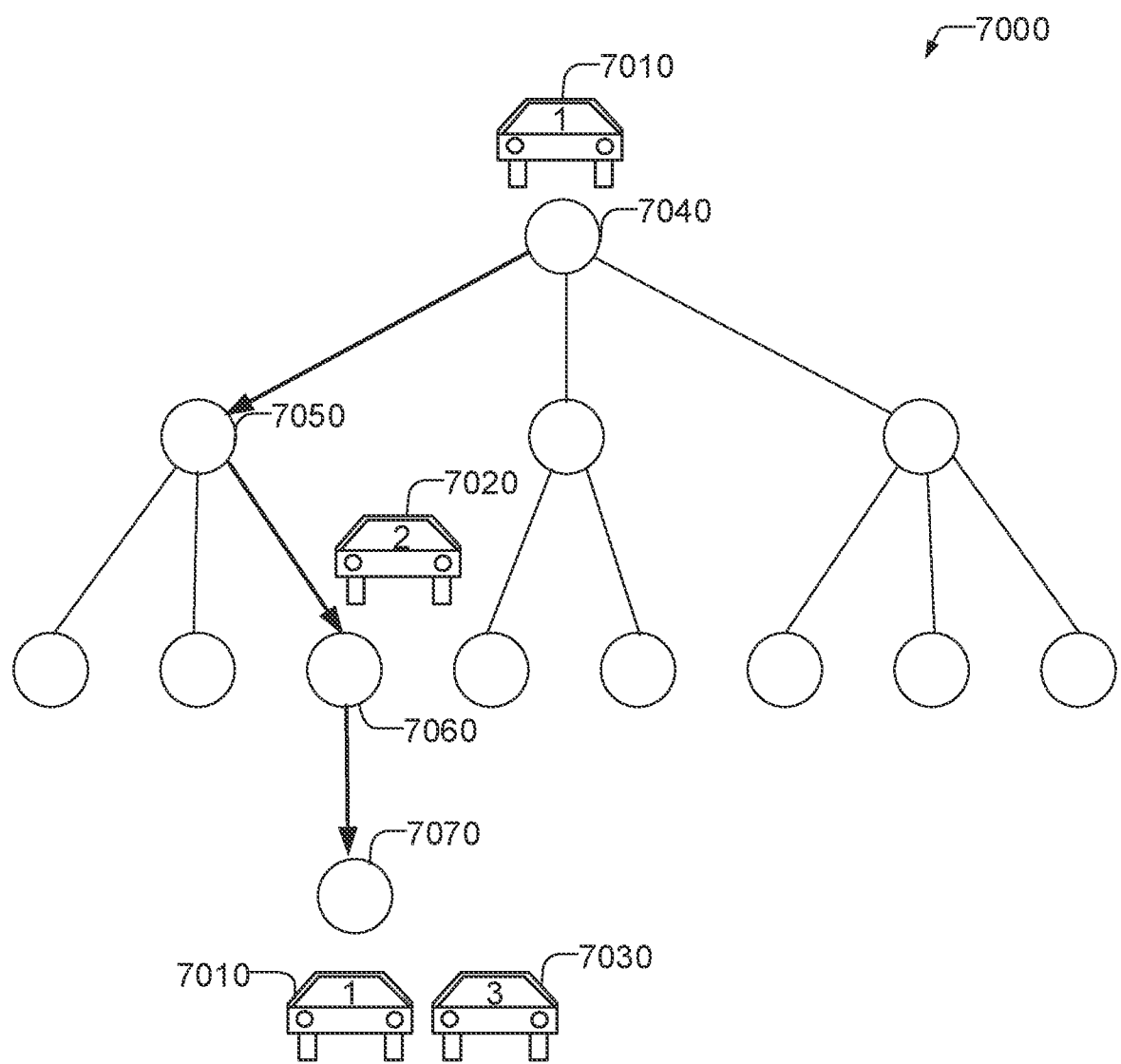
FIG. 7 shows an example state diagram of an item transfer according to some examples of the present disclosure.
Figure 8A:
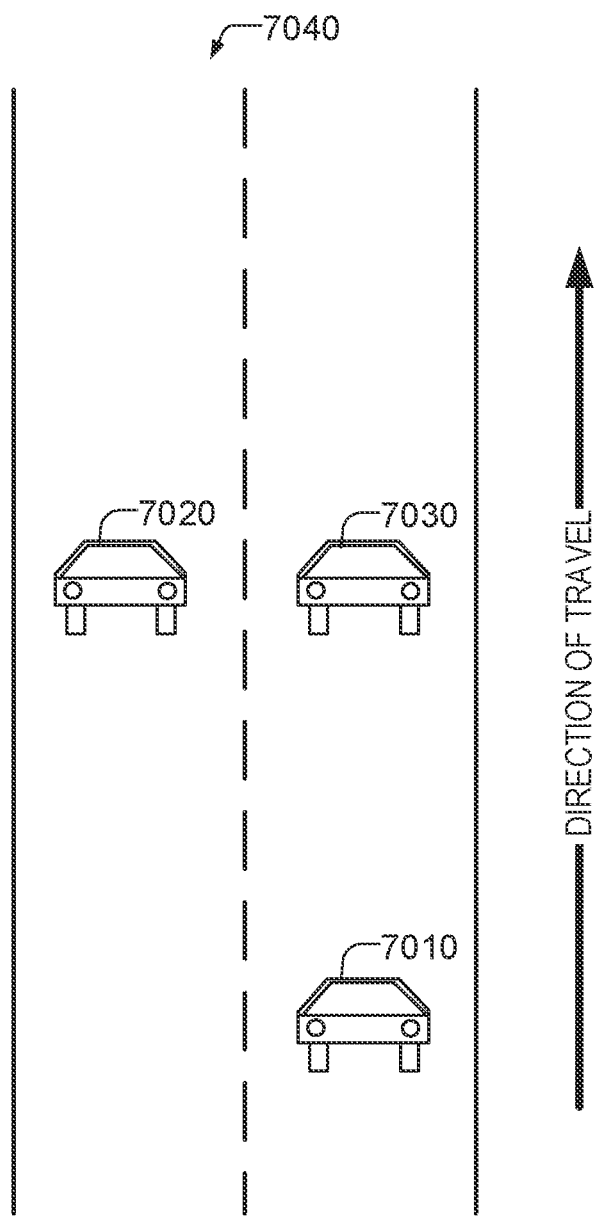
FIGS. 8A-8D show a birds-eye illustration of the state transitions shown in the state diagram of FIG. 7 according to some examples of the present disclosure.
Figure 8B:
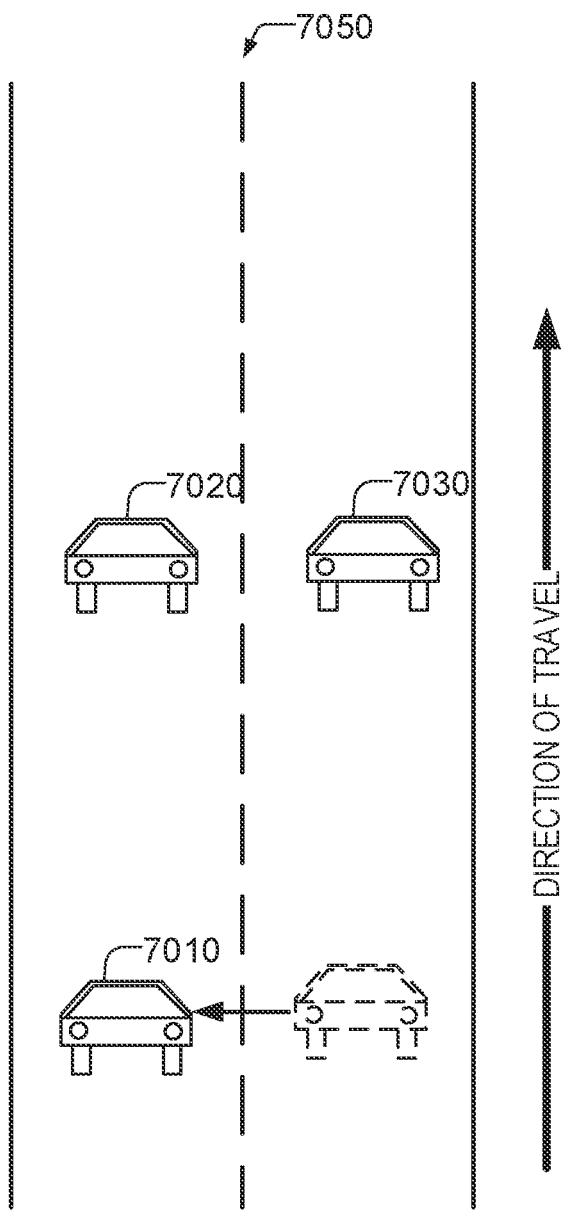
Figure 8C:
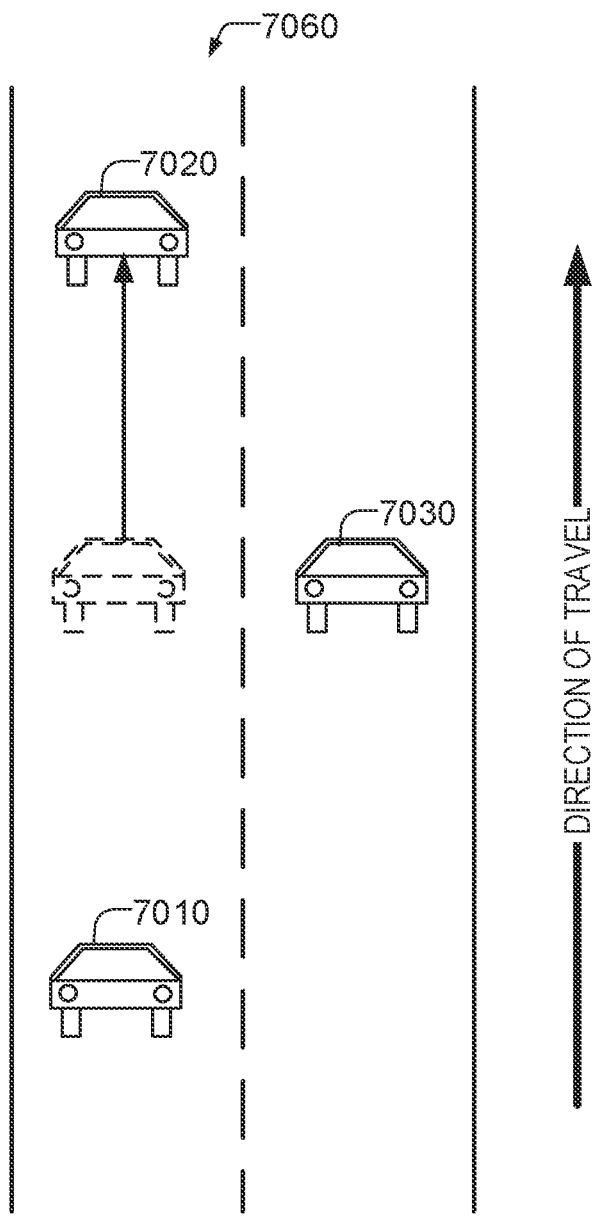
Figure 8D:
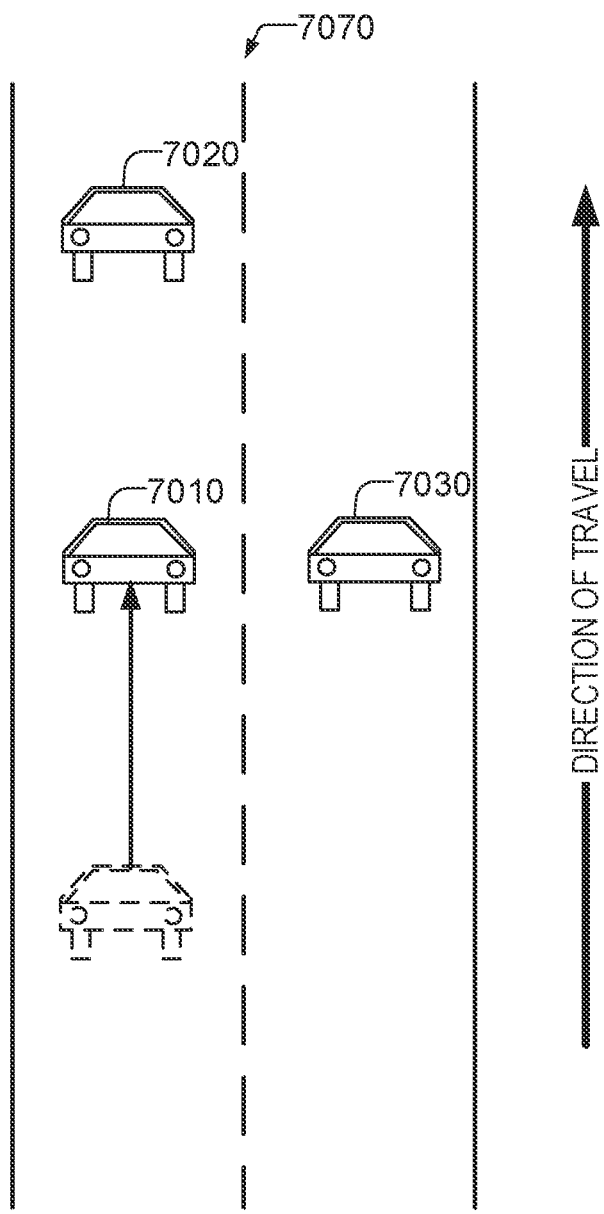

Once the second vehicle is within range, at operation 3040 the autonomous vehicles may maneuver into position. For example, using a machine learning algorithm that inputs the sensor data of the autonomous car and outputs movements. At operation 3050 the vehicles may transfer the goods. FIG. 6 shows an example method of maneuvering into position and transferring the items. In some examples, payment may be exchanged, for example, using short range wireless payment technologies. In some examples, secure vehicle to vehicle identification and confirmation systems may be utilize to verify both the transfer of goods and the payment to deter fraud.

As noted previously, to route a package from a source to a destination, the package may travel on more than one vehicle. The sequence of vehicles the package travels on may be determined ad-hoc, or may be determined by the network-accessible autonomous goods transfer service.

Figure 4:
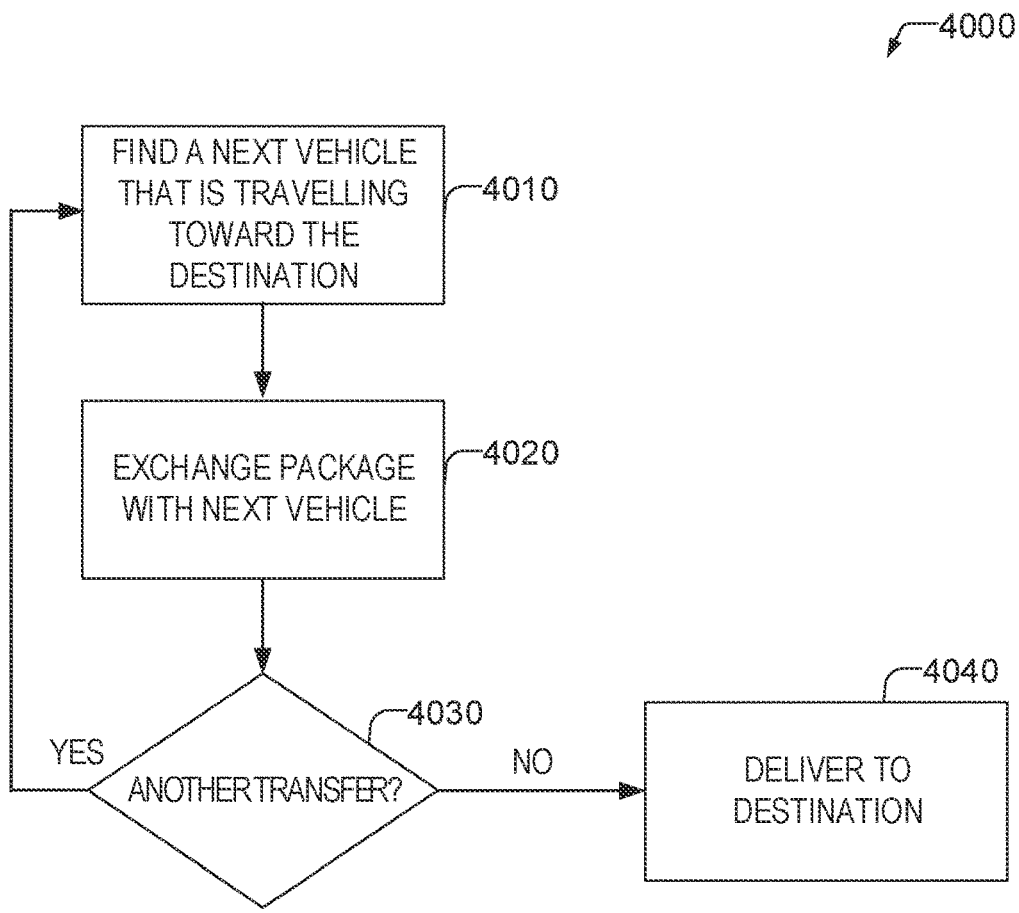
FIG. 4 shows a flowchart of a method of performing an ad-hoc routing of a package between autonomous vehicles to a destination according to some examples of the present disclosure.

Turning now to FIG. 4, a method 4000 of performing an ad-hoc routing of a package between autonomous vehicles to a destination is shown according to some examples of the present disclosure. At the start of the method 4000, the package begins on a first autonomous vehicle. The vehicle then begins its drive and searches for a next vehicle for the package that is travelling toward the package's destination at operation 4010. In some examples, finding vehicles may be accomplished by utilizing routes and coordinates sent by registered vehicles to the network-accessible autonomous goods transfer service. In other examples, the vehicles may have discovery protocols that are used to discover nearby vehicles and their routes between vehicles without the use of the network-accessible autonomous goods transfer service. These discovery protocols may be utilized over a network, or may be based upon short range wireless technologies. Once a vehicle is selected, at operation 4020 the autonomous vehicles execute the method of FIG. 3 to exchange the item.

At operation 4030 the vehicle with the item may determine if another transfer is appropriate. For example, if the current vehicle is headed to the destination of the item, then another transfer would not be needed. Otherwise, if another transfer is needed, then the vehicle with the item would repeat operations 4010-4030. These operations are repeated until the item is delivered to its destination at operation 4040.

For example, to illustrate the ad-hoc approach, if an item is in Texas and destined for Minnesota, a truck that is going from Texas to Arizona may calculate that it is going to be near a truck going from Texas to Oklahoma and may transfer the item to this second truck. The second truck may then carry it to Oklahoma and then look for a truck that carries the item to Kansas. and so on until the package arrives in Minnesota. Each autonomous vehicle may charge a fee for its portion of the overall route. This fee may be negotiated, such that the next "hop" is selected not only based upon route, but also based upon factors such as time and cost. For example, the truck in Texas may first determine all the possible other vehicles to transfer the item to that advances the item closer towards its destination. This list may then be ranked based upon a combination of timeliness and cost. Timeliness and cost may be weighted differently depending on the recipient or sender's wishes.

Throughout this process information on the item may be determined by each autonomous vehicle. For example, source address, destination address, any special restrictions (hazmat or other considerations), remittance information (e.g., a token or other item used by each vehicle for reimbursement from the sender or receiver for carrying the package), and the like. This information may be transferred to each vehicle by the network-accessible autonomous goods transfer service, by wireless communications from another autonomous vehicle (e.g., the information may be transferred to a vehicle at the same time or near the same time as the package is physically loaded on the vehicle), or the information may be on a barcode, RFID chip, or the like attached to the package and scannable by the vehicle. Network-accessible autonomous goods transfer service may also provide this information.

Figure 5:
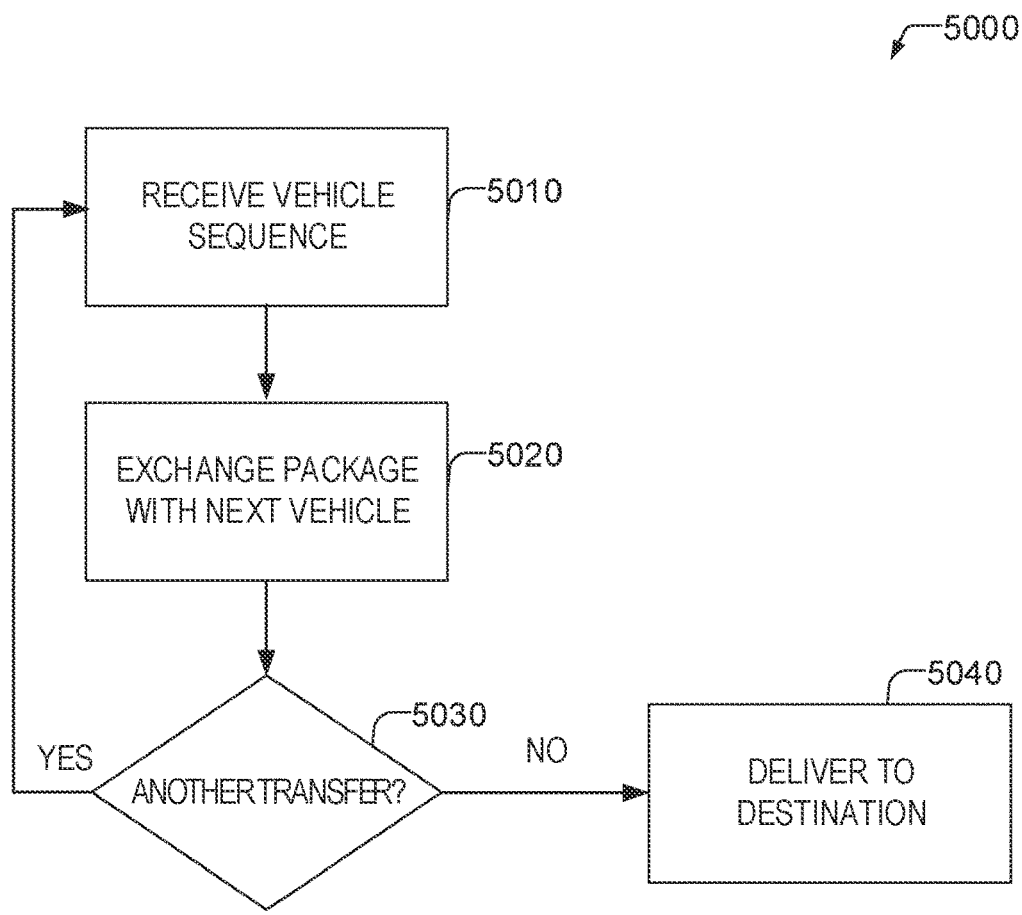
FIG. 5 shows a flowchart of a method of performing a routing of a package between autonomous vehicles to a destination using a network-accessible autonomous goods transfer service according to some examples of the present disclosure.

Turning now to FIG. 5, a method 5000 of performing a routing of a package between autonomous vehicles to a destination using a network-accessible autonomous goods transfer service is shown according to some examples of the present disclosure. At operation 5010 the vehicle may receive the vehicle sequence planned by the network-accessible autonomous goods transfer service. The vehicle sequence may be created by the network-accessible autonomous goods transfer service based upon registration data submitted by participating autonomous vehicles as well as route data, location data, and the like. The sequence may be created, for example, based upon a variant of Dijkstra's algorithm to calculate an optimal path for the package, using a prediction of where participating autonomous vehicles are likely to be at future times and then traversing the list of registered routes to determine autonomous vehicles that are close to this optimal path and fit the time constraints (e.g., that the next vehicles are close to the optimal path when the previous vehicles are near them).

At operation 5020 the vehicle transfers the item to the next vehicle in the sequence, using for example, the method of FIG. 3. At operation 5030 the next vehicle determines whether (based upon the route received from the network-accessible autonomous goods transfer service) another transfer is to take place. If so, operations 5010-5030 are repeated for each new vehicle until the last vehicle in the route that then delivers the package to the destination at operation 5040. Each new vehicle may receive the route from the network-accessible autonomous goods transfer service (which may update the route based upon changes in location of the autonomous vehicles). In other examples, the vehicles may exchange the route information upon transferring the package.

Turning now to FIG. 6 a flowchart of a method 6000 of a goods transfer (e.g., operations 3040, 3050) is shown according to some examples of the present disclosure. Method 6000 may be performed on each of the autonomous vehicles participating in the transaction independently, or one vehicle may be the "master" vehicle that directs the other vehicle. At operation 6010 the autonomous vehicle may determine the current sensor data. Example sensors include proximity sensors to other vehicles (e.g., radar sensors, camera sensors, and laser rangefinders), vehicle recognition sensors, pedestrian recognition sensors, and the like. This sensor data may be processed by the autonomous driving algorithms of the autonomous vehicle to produce a representation of the environment that is nearby. For example, the autonomous driving algorithms may process sensor data to determine that a car is 40 meters ahead and travelling at 60 km/h, there is a car 35 meters behind and travelling at 61 km/h and the target car to complete the transfer is approaching from behind and to the left at a closing speed of 3 km/h.

The sensor data, or the environmental representation of the sensor data may be input into a machine learning algorithm at operation 6020. In examples in which this autonomous vehicle is a master for the transfer, the sensor data input at operation 6020 may also include sensor data or environmental representations received from short range communications from the other autonomous vehicle. In still other examples, the sensor data or environmental representations input to the machine learning algorithm at operation 6020 may be sensor data or environmental representations for all autonomous vehicles (even those not participating in the transfer) in communication range of the vehicle performing method 6000. The machine learning algorithm may include deep learning neural networks trained using simulated package exchanges.

At operation 6020, the machine learning algorithm may output either one or more next states (e.g., change lanes, slow down, speed up), which are then used to determine vehicle control signals to achieve those states, or may output control signals directly. At operation 6030 these signals are then fed to the vehicle control systems to achieve the desired state. In some examples, where the vehicle performing the method 6000 is a master vehicle, this may also include sending the signals (or states) to the other vehicle (or vehicles). In some examples, this may also comprise sending signals or instructions to other vehicles not participating in the transfer. At operation 6040 a determination is made whether the vehicles are in a position to transfer the package. This may be determined based upon predetermined proximity and positioning requirements of the vehicles, or may be based upon detecting optical markers or other indicators of the area where the package is to be placed. If the vehicles are not in a position to transfer, then operations 6010-6040 are repeated.

At operation 6050 the package may be transferred. For example, a robotic arm may be human controlled, or may be autonomously controlled using machine learning algorithms utilizing input from the autonomous vehicle's sensors and/or sensors specific to the robotic arm. As already noted, the system may also utilize inputs from optical markers (either passive markers or light emitters). The markers may be arranged in a known geometry (e.g., the boundaries of the package drop position) and tracking cameras may detect the light coming from the markers. The images may be processed to calculate the marker positions. If the camera is on the robotic arm, the system may move the arm towards the position of the drop position. Weight sensors on the arm may detect when the weight of the package has shifted (e.g., the package has been set down) and release the package and retract the arm.

Turning now to FIGS. 7, and 8A-8D an example decision diagram 7000 of a transfer is shown according to some examples of the present disclosure. FIGS. 8A-D show a birds-eye illustration of the state transitions shown in the decision diagram 7000. The roads illustrated in FIGS. 8A-D are two lane roads with each lane travelling in the direction indicated by the arrow. The states, shown as circles, may be possible outputs of the machine learning algorithm from operation 6020. Each state may have a corresponding set of instructions to cause the autonomous vehicle to maneuver to that state. Each state may have a set of other possible states that are available to transition-to based upon the current state that are indicated with edges. Each edge may be weighted in terms of desirability by the machine learning algorithm. The sequence begins in state 7040 and transitions to state 7050 which may correspond to a state in which car 7010 changes lanes. Once at state 7050 the next transition occurs to state 7060 which corresponds to a state in which car 7020 (which is not involved in the transaction) speeds up. At state 7060 the final state transition to state 7070 is car 1 7010 speeding up to be next to car 3 7030 and then performing the package exchange.

Figure 9:
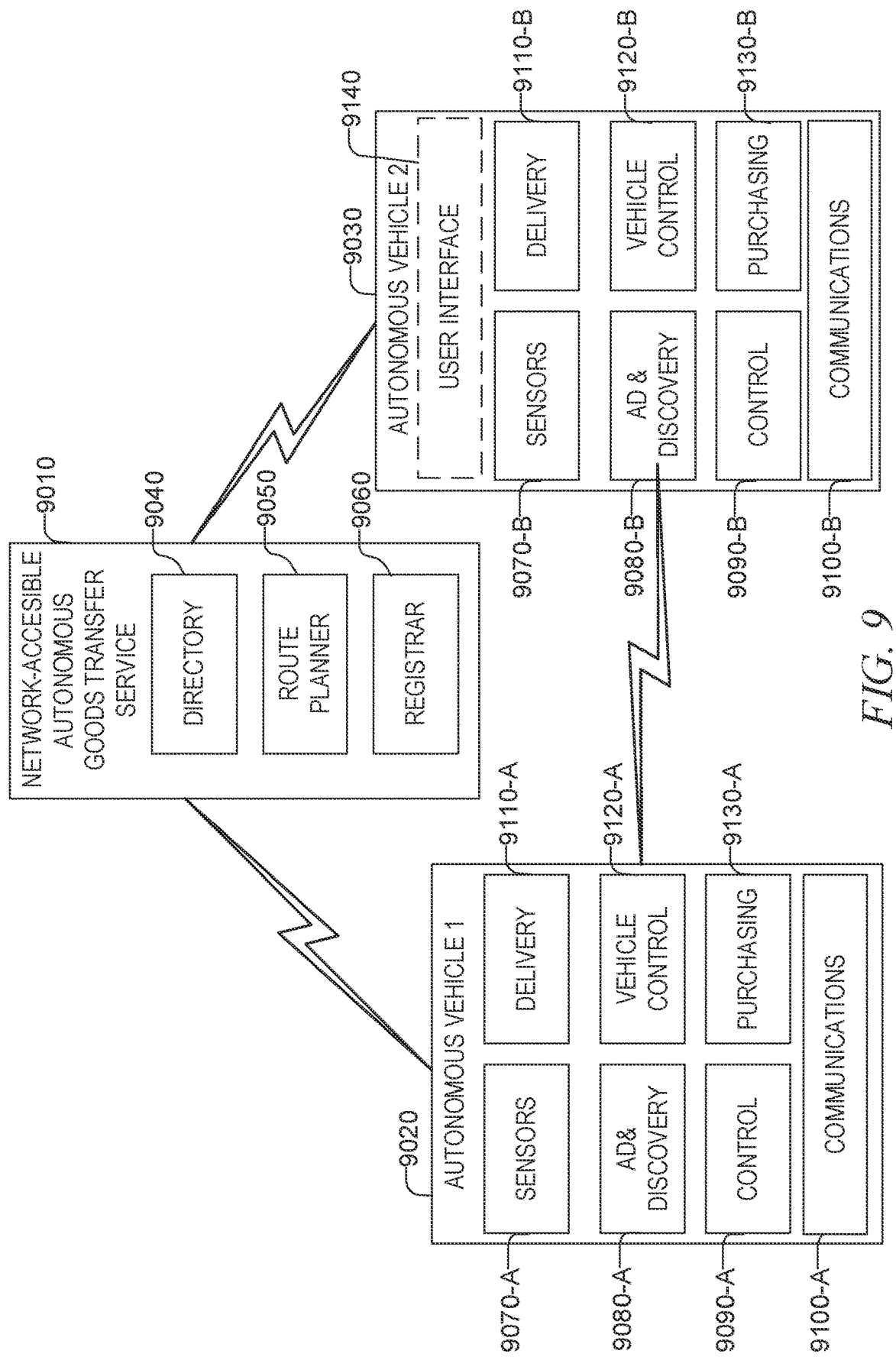
FIG. 9 shows a block diagram of an example network-based autonomous goods transfer service, a first autonomous vehicle, and a second autonomous vehicle according to some examples of the present disclosure.

Turning now to FIG. 9, block diagram of an example network-accessible autonomous goods transfer service 9010, a first autonomous vehicle 9020 and a second autonomous vehicle 9030 according to some examples of the present disclosure. Network-accessible autonomous goods transfer service 9010 may include a directory 9040 which stores information on (including locations and routes) autonomous vehicles registered with the network-accessible autonomous goods transfer service 9010. Route planner 9050 may receive a request for a goods transfer and the location of a rust vehicle 9020 of the transfer. Route planner 9050 may receive the location and/or route of the second vehicle 9030 in the transfer request or else via updates of route and position sent by the second vehicle to the network-accessible autonomous goods transfer service 9010 and stored in the directory 9040. Route planner 9050 may plan a route that brings both vehicles 9020, 9030 within a predetermined proximity of each other at a predetermined time. Additionally, route planner 9050 may calculate a number of "hops" using multiple autonomous vehicles to deliver a package from a source to a destination. Each hop may have a route that brings both vehicles 9020, 9030 in the hop within a predetermined proximity of each other. Route planner 9050 may utilize Dijkstra's algorithm, or other shortest path algorithms to plan the route (both the individual hops and the routes to navigate both vehicles near each other). Network-accessible autonomous goods transfer service may also have a registrar 9060 that receives registrations to participate in autonomous goods transfers as well as updates on vehicle position and route. The registrar 9060 may update the directory. Registrar 9060 may also receive requests for nearby vehicles that offer goods to consumers. The registrar 9060 may then search the directory for entries selling goods nearby the consumer (and in some examples, matching criteria the consumer specifies) and reply with this information to the consumer.

First autonomous vehicle 9020 may include sensors such as sensors 9070-A and second autonomous vehicle 9030 may include sensors 9070-B respectively. Example sensors include cameras, audio sensors, radar sensors. RF sensors, IR sensors, and the like. Sensors 9070-A and sensors 9070-B may include sensors that are part of the package delivery hardware (e.g., a robotic arm). First autonomous vehicle 9020 may include advertisement and discovery 9080-A and second autonomous vehicle 9030 may include advertisement and discovery 9080-B). Advertisement and discovery 9080-A and 9080-B may advertise available goods provided by the vehicle and discover nearby available goods provided by other vehicles. Advertisement may comprise sending broadcast messages over short range wireless RF technologies (e.g., WIFI, BLUETOOTH®, and RFID), other peer-to-peer protocols (e.g., over a network), or may comprise registering and updating the location of the autonomous vehicle to the network-accessible autonomous goods transfer service. Advertisement and discovery 9080-A and 9080-B may discover nearby devices that are offering goods for autonomous vehicle transfer by listening for broadcasts (e.g., through communications 9100-A, 9100-B respectively) or by contacting the network-accessible autonomous goods transfer service 9010.

Delivery 9110-A and delivery 9110-B may control the delivery hardware (e.g., a robotic arm) using sensors 9070 as previously explained. Vehicle control 9120-A and 9120-B may include algorithms that controls the vehicle based upon sensors 9070. Purchasing 9130-A and purchasing 9130-B may handle payments for goods (either accepting or sending payments). Communications 9100-A and communications 9100-B may communicate with the network-accessible autonomous goods transfer service 9010 and the other autonomous vehicle using long and short range wireless technologies. Long range wireless technologies include cellular technologies such as Long Term Evolution (LTE) networks. Control 9090-A and control 9090-B may control the overall process of autonomous goods exchange. For example control 9090-A and 9090-B may implement the methods of FIGS. 3-7 with assistance from the other components within the same autonomous vehicle and/or assistance from other components in a different autonomous vehicle (e.g., sensors 9070-A, sensors 9070-B, advertisement and discovery 9080-A, advertisement and discovery 9080-B, vehicle control 9120-A, vehicle control 9120-B, purchasing 9130-A, purchasing 9130-B, communications 9100-A, and communications 9100-B). In some examples, a consumer's autonomous vehicle may include a user interface 9140-B for displaying purchasing interfaces such as those shown in FIG. 2.

For example, the user may call up a user interface such as shown in FIG. 2. The control 9120-B may control the user interface 9140-B to display the user interfaces and utilize advertising and discovery 9080-B (which may utilize communications 9100-B, or sensors 9070-B (e.g., cameras)) to discover nearby autonomous vehicles participating in vehicle-to-vehicle exchanges by obtaining information on nearby vehicles from the network-accessible autonomous goods transfer service 9010 or by listening for wireless broadcasts. Once a user orders the goods, the control 9090-B determines a route through communication with either the network-accessible autonomous goods transfer service (e.g., the route planner 9050) 9010 or with the other autonomous vehicle 9020 to plan a route to rendezvous with the other vehicle. Once the other vehicles are within a predetermined distance, the control 9090-B and/or control 9090-A positions the vehicles using sensors 9070 (e.g., sensors 9070-A and/or sensors 9070-B) to exchange the goods. Delivery 9110 (e.g., delivery 9110-A and/or delivery 9110-B) then utilizes mechanical hardware to deliver or receive the goods.

Similarly, for the case of a goods merchant, the control 9090-A instructs the advertisement and discovery 9080-A to advertise the products available for purchase and autonomous vehicle transfer. For the case of two autonomous trucks and package routing, the control 9090-A determines what packages are onboard, causes the advertisement and discovery 9080-A to advertise the route and/or position to the network-accessible autonomous goods transfer service 9010 and for packages that are not on the vehicle's route, get a route to the next hop vehicle through route planner 9050. The control 9090-A may then navigate the route using vehicle control 9120-A and sensors 9070-A and then transfers the package to the next vehicle using delivery 9110-A.

The labels A and B are used generally in FIG. 9 in conjunction with the reference numerals to describe a separate instance of a particular component or module. In some examples, each instance may comprise the same set of computer executable instructions as the other instance, but in other examples each instance may implement only a portion of the described functionality. For example, in FIG. 9, the "A" components may implement a merchant functionality and "B" components may have consumer functionalities. As an example advertisement and discovery 9080-B may discover nearby merchants, but may not advertise goods. Likewise in some examples, advertisement and discovery 9080-A may advertise but not discover. These are examples, and one of ordinary skill in the art with the benefit of the present disclosure will appreciate that various different organizations and implementations are possible without departing from the scope of the present disclosure.

Figure 10:
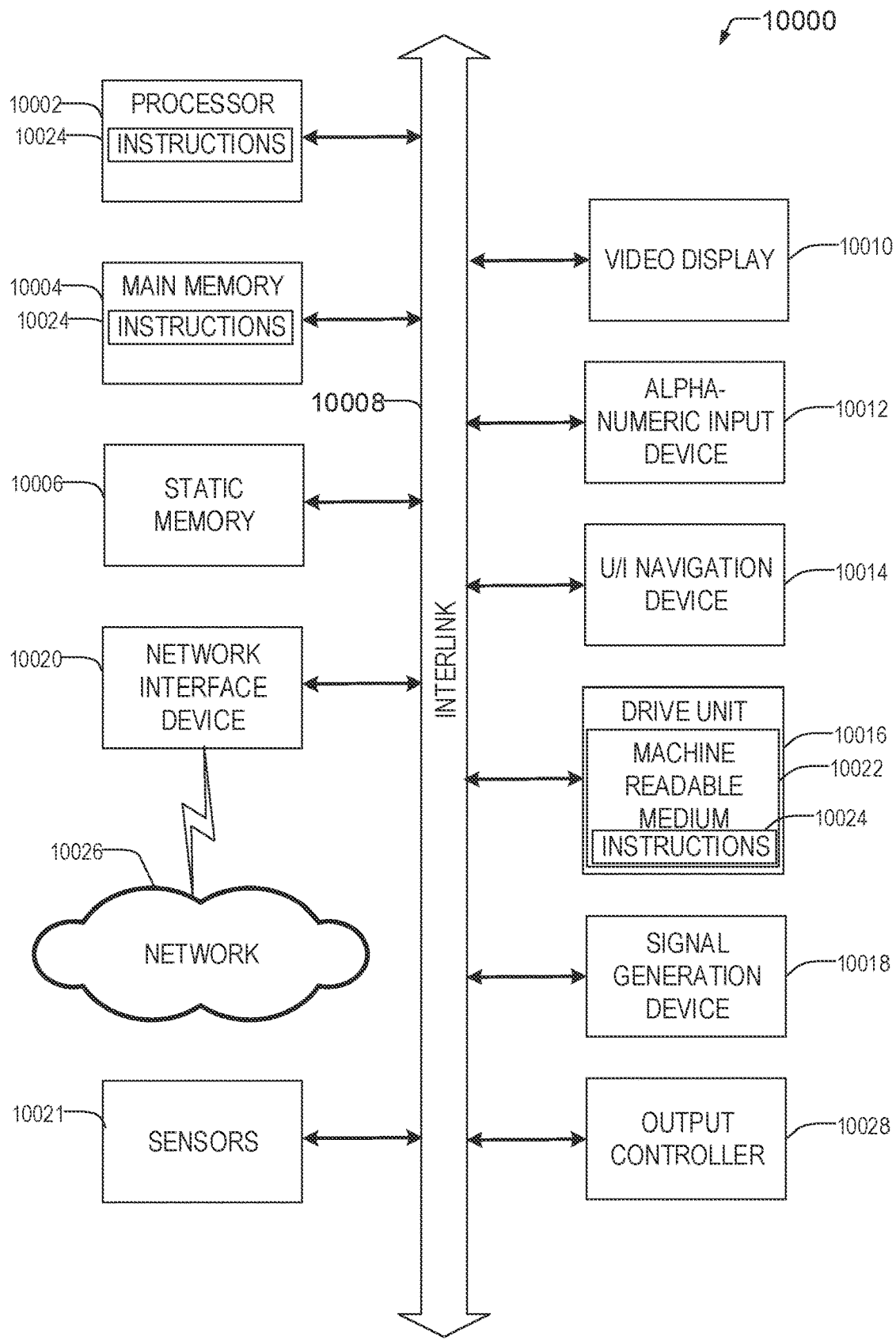
FIG. 10 is a block diagram illustrating an example of a machine upon which one or more embodiments may be implemented.

The above methods, systems, and machine readable mediums may be performed on computing devices integral to, or communicatively coupled with an autonomous vehicle. FIG. 10 illustrates a block diagram of an example machine 10000 upon which any one or more of the techniques (e.g., methodologies) discussed herein may perform. In alternative embodiments, the machine 10000 may operate as a standalone device or may be connected (e.g., networked) to other machines. In a networked deployment, the machine 10000 may operate in the capacity of a server machine, a client machine, or both in server-client network environments. In an example, the machine 10000 may act as a peer machine in peer-to-peer (P2P) (or other distributed) network environment. The machine 10000 may be a computing device integral to or communicatively coupled to an autonomous vehicle, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 10000 may include a hardware processor 10002 (e.g., a central processing unit (CPU), a graphics processing unit (GPU), a hardware processor core, or any combination thereof), a main memory 10004 and a static memory 10006, some or all of which may communicate with each other via an interlink (e.g., bus) 10008. The machine 10000 may further include a display unit 10010, an alphanumeric input device 10012 (e.g., a keyboard), and a user interface (UI) navigation device 10014 (e.g., a mouse). In an example, the display unit 10010, input device 10012 and UI navigation device 10014 may be a touch screen display. The machine 10000 may additionally include a storage device (e.g., drive unit) 10016, a signal generation device 10018 (e.g., a speaker), a network interface device 10020, and one or more sensors 10021, such as a global positioning system (GPS) sensor, compass, accelerometer, or other sensor. The machine 10000 may include an output controller 10028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 10016 may include a machine readable medium 10022 on which is stored one or more sets of data structures or instructions 10024 (e.g., software) embodying or utilized by any one or more of the techniques or functions described herein. The instructions 10024 may also reside, completely or at least partially, within the main memory 10004, within static memory 10006, or within the hardware processor 10002 during execution thereof by the machine 10000. In an example, one or any combination of the hardware processor 10002, the main memory 10004, the static memory 10006, or the storage device 10016 may constitute machine readable media.

While the machine readable medium 10022 is illustrated as a single medium, the term "machine readable medium" may include a single medium or multiple media (e.g., a centralized or distributed database, and/or associated caches and servers) configured to store the one or more instructions 10024.

The term "machine readable medium" may include any medium that is capable of storing, encoding, or carrying instructions for execution by the machine 10000 and that cause the machine 10000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 10024 may further be transmitted or received over a communications network 10026 using a transmission medium via the network interface device 10020. The Machine 10000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 10020 may include one or more physical jacks (e.g., Ethernet, coaxial, or phone jacks) or one or more antennas to connect to the communications network 10026. In an example, the network interface device 10020 may include a plurality of antennas to wirelessly communicate using at least one of single-input multiple-output (SIMO), multiple-input multiple-output (MIMO), or multiple-input single-output (MISO) techniques. In some examples, the network interface device 10020 may wirelessly communicate using Multiple User MIMO techniques.

VARIOUS NOTES & EXAMPLES

Each of these non-limiting examples may stand on its own, or may be combined in various permutations or combinations with one or more of the other examples.

Example 1 is a system for autonomous vehicle-to-vehicle item transfers, the system comprising: at least one processor; at least one machine-readable storage medium, comprising instructions, which when executed by the at least one processor, causes the at least one processor to perform operations comprising: determining a route that will drive a first vehicle to a location that is within a determined distance of a second vehicle, the first vehicle and the second vehicles autonomously driven; driving the determined route autonomously; detecting that the second vehicle is within the determined distance; autonomously maneuvering the first vehicle into a position to transfer the physical item to the second vehicle using sensor inputs; and transferring the physical item between the first and second vehicles while both the first and second vehicles are in motion.

In Example 2, the subject matter of Example 1 optionally includes wherein the operations of autonomously maneuvering the first vehicle into a position to transfer the physical item to the second vehicle comprises using sensor inputs and a machine learning model trained by a machine learning algorithm.

In Example 3, the subject matter of any one or more of Examples 1-2 optionally include wherein the operations of transferring the physical item between the first and second vehicles comprises automatically moving a robotic arm holding the physical item to deliver the physical item to the second vehicle.

In Example 4, the subject matter of Example 3 optionally includes wherein the physical item is delivered to an area of the second vehicle that is marked by optical markers by the second vehicle, and wherein the operations of transferring the physical item to the second vehicle comprises utilizing the optical markers to determine movements of the robotic arm.

In Example 5, the subject matter of any one or more of Examples 1-4 optionally include wherein the operations further comprise advertising the availability of the physical item by one of: broadcasting the availability of the physical item using a short range wireless technology or sending an availability of the physical item to a network-based autonomous goods transfer service.

In Example 6, the subject matter of any one or more of Examples 1-5 optionally include wherein the machine learning algorithm is a deep learning neural network.

In Example 7, the subject matter of any one or more of Examples 1-6 optionally include wherein the operations further comprise accepting a wireless payment for the physical item.

In Example 8, the subject matter of any one or more of Examples 1-7 optionally include wherein the operations further comprise periodically providing route and position information to a network-accessible autonomous goods transfer service.

In Example 9, the subject matter of any one or more of Examples 1-8 optionally include wherein the second vehicle is an end-consumer of the physical item, and wherein the first vehicle is a merchant vehicle.

In Example 10, the subject matter of any one or more of Examples 1-9 optionally include wherein the operations further comprise: making the determination that the transfer of the physical item between the first vehicle and the second vehicle is to occur responsive to: determining a destination of the physical item; and determining that the second vehicle is travelling closer to the destination of the physical item than a current route of the first vehicle.

In Example 11, the subject matter of any one or more of Examples 1-10 optionally include wherein the system further comprises: at the second vehicle, the second vehicle in communication with at least one second processor and at least one second machine readable medium, the at least one second machine readable medium comprising instructions, which when executed by the at least one second processor causes the at least one second processor to perform operations of: determining a destination of the physical item; determining a second route that will drive the second vehicle to a location that is within a predetermined distance of a third vehicle, the third vehicle is travelling closer to the destination of the physical item than a current route of the second vehicle; driving the determined second route autonomously; detecting that the third vehicle is within the predetermined distance; autonomously maneuvering the second vehicle into a position to transfer the physical item to the third vehicle using sensor inputs; and transferring the physical item to the third vehicle while both the second and third vehicles are in motion.

In Example 12, the subject matter of any one or more of Examples 1-11 optionally include wherein the operations of determining that the transfer of the physical item between the first vehicle and the second vehicle is to occur comprises determining that the second vehicle is a next hop for the physical item, the route received from a network-accessible autonomous goods transfer service.

In Example 13, the subject matter of any one or more of Examples 1-12 optionally include wherein the operations of transferring the physical item between the first and second vehicles while both the first and second vehicles are in motion comprises transferring the physical item from the first vehicle to the second vehicle.

In Example 14, the subject matter of any one or more of Examples 1-13 optionally include wherein the operations of transferring the physical item between the first and second vehicles while both the first and second vehicles are in motion comprises transferring the physical item from the second vehicle to the first vehicle.

In Example 15, the subject matter of Example 14 optionally includes wherein the operations further comprise: receiving an advertisement that the second vehicle is offering the physical item; and wherein determining that the transfer of the physical item between the first vehicle and the second vehicle is to occur comprises: presenting a graphical user interface (GUI) displaying information about the physical item; and receiving a selection of the physical item from an occupant of the first vehicle.

In Example 16, the subject matter of Example 15 optionally includes wherein the operations further comprise sending a wireless payment to the second vehicle for the physical item.

In Example 17, the subject matter of any one or more of Examples 1-16 optionally include wherein the operations of determining the route that will drive the first vehicle to a location that is within a determined distance of the second vehicle comprises one of: calculating the route, receiving the route from the second vehicle, negotiating the route with the second vehicle, or receiving the route from network-accessible autonomous goods transfer service.

Example 18 is a method for autonomous vehicle-to-vehicle item transfers, the method comprising: at a first vehicle that is autonomously driven: determining a route that will drive a first vehicle to a location that is within a determined distance of a second vehicle, the first and second vehicles autonomously driven; driving the determined route autonomously; detecting that the second vehicle is within the determined distance; autonomously maneuvering the first vehicle into a position to transfer the physical item to the second vehicle using sensor inputs; and transferring the physical item between the first and second vehicles while both the first and second vehicles are in motion.

In Example 19, the subject matter of Example 18 optionally includes wherein autonomously maneuvering the first vehicle into a position to transfer the physical item to the second vehicle comprises using sensor inputs and a machine learning model trained by a machine learning algorithm.

In Example 20, the subject matter of any one or more of Examples 18-19 optionally include wherein transferring the physical item between the first and second vehicles comprises automatically moving a robotic arm holding the physical item to deliver the physical item to the second vehicle.

In Example 21, the subject matter of Example 20 optionally includes wherein the physical item is delivered to an area of the second vehicle that is marked by optical markers by the second vehicle, and wherein transferring the physical item to the second vehicle comprises utilizing the optical markers to determine movements of the robotic arm.

In Example 22, the subject matter of any one or more of Examples 18-21 optionally include advertising the availability of the physical item by one of: broadcasting the availability of the physical item using a short range wireless technology or sending an availability of the physical item to a network-based autonomous goods transfer service.

In Example 23, the subject matter of any one or more of Examples 18-22 optionally include wherein the machine learning algorithm is a deep learning neural network.

In Example 24, the subject matter of any one or more of Examples 18-23 optionally include accepting a wireless payment for the physical item.

In Example 25, the subject matter of any one or more of Examples 18-24 optionally include periodically providing route and position information to a network-accessible autonomous goods transfer service.

In Example 26, the subject matter of any one or more of Examples 18-25 optionally include wherein the second vehicle is an end-consumer of the physical item, and wherein the first vehicle is a merchant vehicle.

In Example 27, the subject matter of any one or more of Examples 18-26 optionally include making the determination that the transfer of the physical item between the first vehicle and the second vehicle is to occur responsive to: determining a destination of the physical item; and determining that the second vehicle is travelling closer to the destination of the physical item than a current route of the first vehicle.

In Example 28, the subject matter of any one or more of Examples 18-27 optionally include at the second vehicle: determining a destination of the physical item; and determining a second route that will drive the second vehicle to a location that is within a predetermined distance of a third vehicle, the third vehicle is travelling closer to the destination of the physical item than a current route of the second vehicle; driving the determined second route autonomously; detecting that the third vehicle is within the predetermined distance; autonomously maneuvering the second vehicle into a position to transfer the physical item to the third vehicle; and transferring the physical item to the third vehicle while both the second and third vehicles are in motion.

In Example 29, the subject matter of any one or more of Examples 18-28 optionally include wherein determining that the transfer of the physical item between the first vehicle and the second vehicle is to occur comprises determining that the second vehicle is a next hop for the physical item, the route received from a network-accessible autonomous goods transfer service.

In Example 30, the subject matter of any one or more of Examples 18-29 optionally include wherein transferring the physical item between the first and second vehicles while both the first and second vehicles are in motion comprises transferring the physical item from the first vehicle to the second vehicle.

In Example 31, the subject matter of any one or more of Examples 18-30 optionally include wherein transferring the physical item between the first and second vehicles while both the first and second vehicles are in motion comprises transferring the physical item from the second vehicle to the first vehicle.

In Example 32, the subject matter of Example 31 optionally includes receiving an advertisement that the second vehicle is offering the physical item; and wherein determining that the transfer of the physical item between the first vehicle and the second vehicle is to occur comprises: presenting a graphical user interface (GUI) displaying information about the physical item; and receiving a selection of the physical item from an occupant of the first vehicle.

In Example 33, the subject matter of Example 32 optionally includes sending a wireless payment to the second vehicle for the physical item.

In Example 34, the subject matter of any one or more of Examples 18-33 optionally include wherein determining the route that will drive the first vehicle to a location that is within a determined distance of the second vehicle comprises one of: calculating the route, receiving the route from the second vehicle, negotiating the route with the second vehicle, or receiving the route from network-accessible autonomous goods transfer service.

Example 35 is at least one machine readable medium for autonomous vehicle-to-vehicle item transfers, the machine readable medium comprising instructions, which when executed by a machine causes the machine to perform operations comprising: at a first vehicle that is autonomously driven: determining a route that will drive the first vehicle to a location that is within a determined distance of a second vehicle, the second vehicle autonomously driven; driving the determined route autonomously; detecting that the second vehicle is within the determined distance; autonomously maneuvering the first vehicle into a position to transfer the physical item to the second vehicle using sensor inputs; and transferring the physical item between the first and second vehicles while both the first and second vehicles are in motion.

In Example 36, the subject matter of Example 35 optionally includes wherein the operations of autonomously maneuvering the first vehicle into a position to transfer the physical item to the second vehicle comprises using sensor inputs and a machine learning model trained by a machine learning algorithm.

In Example 37, the subject matter of any one or more of Examples 35-36 optionally include wherein the operations of transferring the physical item between the rust and second vehicles comprises automatically moving a robotic arm holding the physical item to deliver the physical item to the second vehicle.

In Example 38, the subject matter of Example 37 optionally includes wherein the physical item is delivered to an area of the second vehicle that is marked by optical markers by the second vehicle, and wherein the operations of transferring the physical item to the second vehicle comprises utilizing the optical markers to determine movements of the robotic arm.

In Example 39, the subject matter of any one or more of Examples 35-38 optionally include wherein the operations further comprise advertising the availability of the physical item by one of: broadcasting the availability of the physical item using a short range wireless technology or sending an availability of the physical item to a network-based autonomous goods transfer service.

In Example 40, the subject matter of any one or more of Examples 35-39 optionally include wherein the machine learning algorithm is a deep learning neural network.

In Example 41, the subject matter of any one or more of Examples 35-40 optionally include wherein the operations further comprise accepting a wireless payment for the physical item.

In Example 42, the subject matter of any one or more of Examples 35-41 optionally include wherein the operations further comprise periodically providing route and position information to a network-accessible autonomous goods transfer service.

In Example 43, the subject matter of any one or more of Examples 35-42 optionally include wherein the second vehicle is an end-consumer of the physical item, and wherein the first vehicle is a merchant vehicle.

In Example 44, the subject matter of any one or more of Examples 35-43 optionally include wherein the operations further comprise: making the determination that the transfer of the physical item between the first vehicle and the second vehicle is to occur responsive to: determining a destination of the physical item; and determining that the second vehicle is travelling closer to the destination of the physical item than a current route of the first vehicle.

In Example 45, the subject matter of any one or more of Examples 35-44 optionally include wherein the operations further comprise at the second vehicle: determining a destination of the physical item; and determining a second route that will drive the second vehicle to a location that is within a predetermined distance of a third vehicle, the third vehicle is travelling closer to the destination of the physical item than a current route of the second vehicle; driving the determined second route autonomously; detecting that the third vehicle is within the predetermined distance; autonomously maneuvering the second vehicle into a position to transfer the physical item to the third vehicle using sensor inputs; and transferring the physical item to the third vehicle while both the second and third vehicles are in motion.

In Example 46, the subject matter of any one or more of Examples 35-45 optionally include wherein the operations of determining that the transfer of the physical item between the first vehicle and the second vehicle is to occur comprises determining that the second vehicle is a next hop for the physical item, the route received from a network-accessible autonomous goods transfer service.

In Example 47, the subject matter of any one or more of Examples 35-46 optionally include wherein the operations of transferring the physical item between the first and second vehicles while both the first and second vehicles are in motion comprises transferring the physical item from the first vehicle to the second vehicle.

In Example 48, the subject matter of any one or more of Examples 35-47 optionally include wherein the operations of transferring the physical item between the first and second vehicles while both the first and second vehicles are in motion comprises transferring the physical item from the second vehicle to the first vehicle.

In Example 49, the subject matter of Example 48 optionally includes wherein the operations further comprise: receiving an advertisement that the second vehicle is offering the physical item; and wherein determining that the transfer of the physical item between the first vehicle and the second vehicle is to occur comprises: presenting a graphical user interface (GUI) displaying information about the physical item; and receiving a selection of the physical item from an occupant of the rust vehicle.

In Example 50, the subject matter of Example 49 optionally includes wherein the operations further comprise sending a wireless payment to the second vehicle for the physical item.

In Example 51, the subject matter of any one or more of Examples 35-50 optionally include wherein the operations of determining the route that will drive the first vehicle to a location that is within a determined distance of the second vehicle comprises one of: calculating the route, receiving the route from the second vehicle, negotiating the route with the second vehicle, or receiving the route from network-accessible autonomous goods transfer service.

Example 52 is a device for autonomous vehicle-to-vehicle item transfers, the device comprising: at a first vehicle that is autonomously driven: means for determining that a transfer of a physical item between the first vehicle and a second vehicle is to occur, the second vehicle autonomously driven; means for determining a route that will drive the first vehicle to a location that is within a determined distance of the second vehicle; means for driving the determined route autonomously; means for detecting that the second vehicle is within the determined distance; means for autonomously maneuvering the first vehicle into a position to transfer the physical item to the second vehicle using sensor inputs; and means for transferring the physical item between the first and second vehicles while both the first and second vehicles are in motion.

In Example 53, the subject matter of Example 52 optionally includes wherein the means for autonomously maneuvering the first vehicle into a position to transfer the physical item to the second vehicle using sensor inputs comprises means for autonomously maneuvering the first vehicle into a position to transfer the physical item to the second vehicle using sensor inputs and a machine learning model trained by a machine learning algorithm.

In Example 54, the subject matter of any one or more of Examples 52-53 optionally include wherein the means for transferring the physical item between the first and second vehicles comprises means for automatically moving a robotic arm holding the physical item to deliver the physical item to the second vehicle.

In Example 55, the subject matter of Example 54 optionally includes wherein the physical item is delivered to an area of the second vehicle that is marked by optical markers by the second vehicle, and wherein the means for transferring the physical item to the second vehicle comprises means for utilizing the optical markers to determine movements of the robotic arm.

In Example 56, the subject matter of any one or more of Examples 52-55 optionally include means for advertising the availability of the physical item by one of: broadcasting the availability of the physical item using a short range wireless technology or sending an availability of the physical item to a network-based autonomous goods transfer service.

In Example 57, the subject matter of any one or more of Examples 52-56 optionally include wherein the machine learning algorithm is a deep learning neural network.

In Example 58, the subject matter of any one or more of Examples 52-57 optionally include means for accepting a wireless payment for the physical item.

In Example 59, the subject matter of any one or more of Examples 52-58 optionally include means for periodically providing route and position information to a network-accessible autonomous goods transfer service.

In Example 60, the subject matter of any one or more of Examples 52-59 optionally include wherein the second vehicle is an end-consumer of the physical item, and wherein the first vehicle is a merchant vehicle.

In Example 61, the subject matter of any one or more of Examples 52-60 optionally include means for making the determination that the transfer of the physical item between the first vehicle and the second vehicle is to occur responsive to: means for determining a destination of the physical item; and means for determining that the second vehicle is travelling closer to the destination of the physical item than a current route of the first vehicle.

In Example 62, the subject matter of any one or more of Examples 52-61 optionally include at the second vehicle: means for determining a destination of the physical item; and means for determining that a third vehicle is travelling closer to the destination of the physical item than a current route of the second vehicle; and responsive to determining that the third vehicle is travelling closer to the destination of the physical item: means for determining a second route that will drive the second vehicle to a location that is within a predetermined distance of the third vehicle; means for driving the determined second route autonomously; means for detecting that the third vehicle is within the predetermined distance; autonomously maneuvering the second vehicle into a position to transfer the physical item to the third vehicle using sensor inputs; and means for transferring the physical item to the third vehicle while both the second and third vehicles are in motion.

In Example 63, the subject matter of any one or more of Examples 52-62 optionally include wherein the means for determining that the transfer of the physical item between the first vehicle and the second vehicle is to occur comprises determining that the second vehicle is a next hop for the physical item, the route received from a network-accessible autonomous goods transfer service.

In Example 64, the subject matter of any one or more of Examples 52-63 optionally include wherein the means for transferring the physical item between the first and second vehicles while both the first and second vehicles are in motion comprises means for transferring the physical item from the first vehicle to the second vehicle.

In Example 65, the subject matter of any one or more of Examples 52-64 optionally include wherein the means for transferring the physical item between the first and second vehicles while both the first and second vehicles are in motion comprises means for transferring the physical item from the second vehicle to the first vehicle.

In Example 66, the subject matter of Example 65 optionally includes means for receiving an advertisement that the second vehicle is offering the physical item; and wherein determining that the transfer of the physical item between the first vehicle and the second vehicle is to occur comprises: means for presenting a graphical user interface (GUI) displaying information about the physical item; and means for receiving a selection of the physical item from an occupant of the first vehicle.

In Example 67, the subject matter of Example 66 optionally includes means for sending a wireless payment to the second vehicle for the physical item.

In Example 68, the subject matter of any one or more of Examples 52-67 optionally include wherein the means for determining the route that will drive the first vehicle to a location that is within a determined distance of the second vehicle comprises one of: means for calculating the route, means for receiving the route from the second vehicle, means for negotiating the route with the second vehicle, or means for receiving the route from network-accessible autonomous goods transfer service.

Example 69 is at least one machine-readable medium including instructions, which when executed by a machine, cause the machine to perform operations of any one of Examples 1-68.

Example 70 is an apparatus comprising means for performing any of the operations of Examples 1-68.

Example 71 is a system to perform the operations of any of the Examples 1-68.

Example 72 is a method to perform the operations of any of the Examples 1-68.

What is claimed is:

1. At least one non-transitory machine-readable medium for controlling autonomous vehicle-to-vehicle item transfers, the at least one non-transitory machine-readable medium comprising instructions, which when executed by processing circuitry of a computing machine, cause the processing circuitry to perform operations to:
obtain a request for an item, wherein the request indicates a delivery destination for the item;
identify a first vehicle having the item within an inventory of a plurality of available items;
perform a first determination to determine whether one or more different vehicles from a plurality of vehicles within a predetermined distance of the first vehicle has a route that places the one or more different vehicles closer to the delivery destination than a current route of the first vehicle, the route of the one or more different vehicles being different than the current route of the first vehicle;
identify, in response to the first determination, a second vehicle from the one or more different vehicles of the plurality of vehicles to receive the item from the first vehicle, the second vehicle having a particular route that places the second vehicle closer to the delivery destination than the current route of the first vehicle;
perform a second determination to determine a modified route for the first vehicle and a second modified route for the second vehicle that places the first vehicle and the second vehicle within a predetermined proximity to each other, the first vehicle and the second vehicle each being independent and conducting navigation under autonomous control;
communicate the modified route to the first vehicle and the second modified route to the second vehicle;
maneuver the first vehicle and the second vehicle to navigate within the predetermined proximity to each other;
control the first vehicle to transfer of the item from the first vehicle to the second vehicle, when the first vehicle and the second vehicle are within the predetermined proximity, wherein the first vehicle and the second vehicle are configured to perform the transfer of the item while each vehicle is physically uncoupled and remains under autonomous control; and
control the second vehicle to navigate toward the delivery destination.

2. The at least one non-transitory machine-readable medium of claim 1, wherein the instructions further cause the processing circuitry to:
advertise an availability of the item using a broadcast transmission provided via a short range wireless technology, wherein the first vehicle is identified based on information received from the broadcast transmission.

3. The at least one non-transitory machine-readable medium of claim 1, wherein the instructions further cause the processing circuitry to:
advertise an availability of the item to a mobile device, wherein the request for the item is obtained from the mobile device in response to the advertised availability, and wherein the request for the item is generated based on information presented on a visual display and detected by a camera sensor of the mobile device.

4. The at least one non-transitory machine-readable medium of claim 1, wherein the operations to control the transfer of the item from the first vehicle to the second vehicle include operations to cause automatic control of movement of a robotic arm holding the item to deliver the item to the second vehicle.

5. The at least one non-transitory machine-readable medium of claim 4, wherein the item is delivered to an area of the second vehicle that is marked by optical markers by the second vehicle, and wherein the operations to control the transfer of the item to the second vehicle include operations to utilize the optical markers to determine movements of the robotic arm.

6. The at least one non-transitory machine-readable medium of claim 1, wherein the operations to control the transfer of the item include operations to cause autonomous control of maneuvering of the first vehicle into a position to transfer the item to the second vehicle, using sensor inputs and a machine learning model trained by a machine learning algorithm.

7. The at least one non-transitory machine-readable medium of claim 1, wherein the operations to determine the modified route for the first vehicle comprise at least one of:
calculating the modified route,
receiving the modified route from the second vehicle,
negotiating the modified route with the second vehicle, or
receiving the modified route from a network-accessible autonomous goods transfer service.

8. The at least one non-transitory machine-readable medium of claim 1, wherein the instructions further cause the processing circuitry to:
determine the second vehicle is within a proximity of the delivery destination or has delivered the item to the delivery destination; and
initiate a request for payment of the item.

9. The at least one non-transitory machine-readable medium of claim 1, wherein the operations to identify the second vehicle from the plurality of vehicles further includes operations to:
receive sensor data from the plurality of vehicles; and
sort the plurality of vehicles, using the sensor data, to identify the second vehicle based on at least one of time or cost.

10. The at least one non-transitory machine-readable medium of claim 1, wherein the instructions further cause the processing circuitry to:
identify a third vehicle from a second plurality of vehicles based on a route for the third vehicle that places the third vehicle closer to the delivery destination than the route of the second vehicle;
determine a modified route for the second vehicle that places the second vehicle within a predetermined proximity of the third vehicle, the second vehicle and the third vehicle each being independent and conducting navigation under autonomous control;
communicate the modified route to the second vehicle and control the second vehicle to navigate within the predetermined proximity of the third vehicle; and
when the second vehicle and the third vehicle are within the predetermined proximity, control the transfer of the item from the second vehicle to the third vehicle, wherein the second vehicle and the third vehicle are configured to perform the transfer of the item while each vehicle is physically uncoupled and remains under autonomous control.

11. A computing system for controlling autonomous vehicle-to-vehicle item transfers, the computing system comprising:
communications circuitry configured to receive a request for an item, wherein the request indicates a delivery destination for the item; and
processing circuitry configured to:
identify a first vehicle having the item within an inventory of a plurality of available items;
perform a first determination to determine whether one or more different vehicles from a plurality of vehicles within predetermined distance of the first vehicle has a route that places the one or more different vehicles closer to the delivery destination than a current route of the first vehicle, the route of the one or more different vehicles being different than the current route of the first vehicle;
identify, in response to the first determination, a second vehicle from the one or more different vehicles of plurality of vehicles to receive the item from the first vehicle, the second vehicle having a particular route that places the second vehicle closer to the delivery destination than the current route of the first vehicle;
perform a second determination to determine a modified route for the first vehicle and a second modified route for the second vehicle that places the first vehicle and the second vehicle within a predetermined proximity to each other, the first vehicle and the second vehicle each being independent and conducting navigation under autonomous control on roadways; and
control the first vehicle to transfer of the item from the first vehicle to the second vehicle, when the first vehicle and the second vehicle are within the predetermined proximity, wherein the first vehicle and the second vehicle are configured to perform the transfer of the item while each vehicle is physically uncoupled and remains under autonomous control;
wherein the communications circuitry is further configured to transmit the modified route to the first vehicle and the second modified route to the second vehicle, and wherein the processing circuitry is further configured to maneuver first vehicle and the second vehicle to navigate within the predetermined proximity to each other and control the second vehicle to navigate toward the delivery destination.

12. The computing system of claim 11, wherein the communications circuitry is further configured to:
broadcast an availability of the item using a broadcast transmission provided via a short range wireless technology, wherein the first vehicle is identified based on information received from the broadcast transmission.

13. The computing system of claim 11, wherein the communications circuitry is further configured to:
transmit an availability of the item to a mobile device, wherein the request for the item is obtained from the mobile device in response to the transmitted availability, and wherein the request for the item is generated based on information presented on a visual display and detected by a camera sensor of the mobile device.

14. The computing system of claim 11, wherein operations to control the transfer of the item from the first vehicle to the second vehicle include operations to cause automatic control of movement of a robotic arm holding the item to deliver the item to the second vehicle.

15. The computing system of claim 14, wherein the item is delivered to an area of the second vehicle that is marked by optical markers by the second vehicle, and wherein the operations to control the transfer of the item to the second vehicle include operations to utilize the optical markers to determine movements of the robotic arm.

16. The computing system of claim 11, wherein operations to control the transfer of the item include operations to cause autonomous control of maneuvering of the first vehicle into a position to transfer the item to the second vehicle, using sensor inputs and a machine learning model trained by a machine learning algorithm.

17. The computing system of claim 11, wherein operations to determine the modified route for the first vehicle comprise at least one of:
calculating the modified route,
receiving the modified route from the second vehicle,
negotiating the modified route with the second vehicle, or
receiving the modified route from a network-accessible autonomous goods transfer service.

18. The computing system of claim 11, wherein the processing circuitry is further configured to:
   determine the second vehicle is within a proximity of the delivery destination or has delivered the item to the delivery destination; and
   initiate a request for payment of the item.

19. The computing system of claim 11, wherein operations to identify the second vehicle from the plurality of vehicles further includes operations to:
   process sensor data obtained from the plurality of vehicles; and
   sort the plurality of vehicles, using the sensor data, to identify the second vehicle based on at least one of time or cost.

20. The computing system of claim 11, wherein the processing circuitry is further configured to:
   identify a third vehicle from a second plurality of vehicles based on a route for the third vehicle that places the third vehicle closer to the delivery destination than the route of the second vehicle;
   determine a modified route for the second vehicle that places the second vehicle within a predetermined proximity of the third vehicle, the second vehicle and the third vehicle each being independent and conducting navigation under autonomous control on roadways; and
   when the second vehicle and the third vehicle are within the predetermined proximity, control the transfer of the item from the second vehicle to the third vehicle, wherein the second vehicle and the third vehicle are configured to perform the transfer of the item while each vehicle is physically uncoupled and remains under autonomous control;
   wherein the communications circuitry is further configured to transmit the modified route to the second vehicle and wherein the processing circuitry is further configured to control the second vehicle to navigate within the predetermined proximity of the third vehicle.

* * * * *